No. 867,745.

PATENTED OCT. 8, 1907.

J. H. McLEOD.
AUTOMATIC WEIGHING MACHINE.
APPLICATION FILED FEB. 27, 1907.

9 SHEETS—SHEET 2.

WITNESSES
F. C. Barry
Amos W Hart

INVENTOR
JOHN H. McLEOD
BY Munn & Co.
ATTORNEYS

No. 867,745. PATENTED OCT. 8, 1907.
J. H. McLEOD.
AUTOMATIC WEIGHING MACHINE.
APPLICATION FILED FEB. 27, 1907.

9 SHEETS—SHEET 3.

WITNESSES
F. C. Bauer
Amos W. Hart

INVENTOR
JOHN H. McLEOD
BY Munn & Co.
ATTORNEYS

No. 867,745. PATENTED OCT. 8, 1907.
J. H. McLEOD.
AUTOMATIC WEIGHING MACHINE.
APPLICATION FILED FEB. 27, 1907.

9 SHEETS—SHEET 4.

WITNESSES
F. C. Barry
Amos W. Hart

INVENTOR
JOHN H. McLEOD
BY Munn & Co.
ATTORNEYS

No. 867,745. PATENTED OCT. 8, 1907.
J. H. McLEOD.
AUTOMATIC WEIGHING MACHINE.
APPLICATION FILED FEB. 27, 1907.

9 SHEETS—SHEET 5.

WITNESSES
F. C. Barry
Amos W. Hart

INVENTOR
JOHN H. McLEOD
BY Munn & Co.
ATTORNEYS

THE NORRIS PETERS CO., WASHINGTON, D. C.

No. 867,745.

PATENTED OCT. 8, 1907.

J. H. McLEOD.
AUTOMATIC WEIGHING MACHINE.
APPLICATION FILED FEB. 27, 1907.

9 SHEETS—SHEET 6.

WITNESSES
F. C. Barry

INVENTOR
JOHN H. McLEOD
BY Munn & Co.
ATTORNEYS

No. 867,745.

PATENTED OCT. 8, 1907.

J. H. McLEOD.
AUTOMATIC WEIGHING MACHINE.
APPLICATION FILED FEB. 27, 1907.

9 SHEETS—SHEET 7.

WITNESSES
F.C. Barry
Amos W Hart

INVENTOR
JOHN H. McLEOD
BY Munn & Co.
ATTORNEYS

No. 867,745. PATENTED OCT. 8, 1907.
J. H. McLEOD.
AUTOMATIC WEIGHING MACHINE.
APPLICATION FILED FEB. 27, 1907.

9 SHEETS—SHEET 8.

WITNESSES
F. C. Barry
Amos W. Hart

INVENTOR
JOHN H. McLEOD
BY Munn & Co.
ATTORNEYS

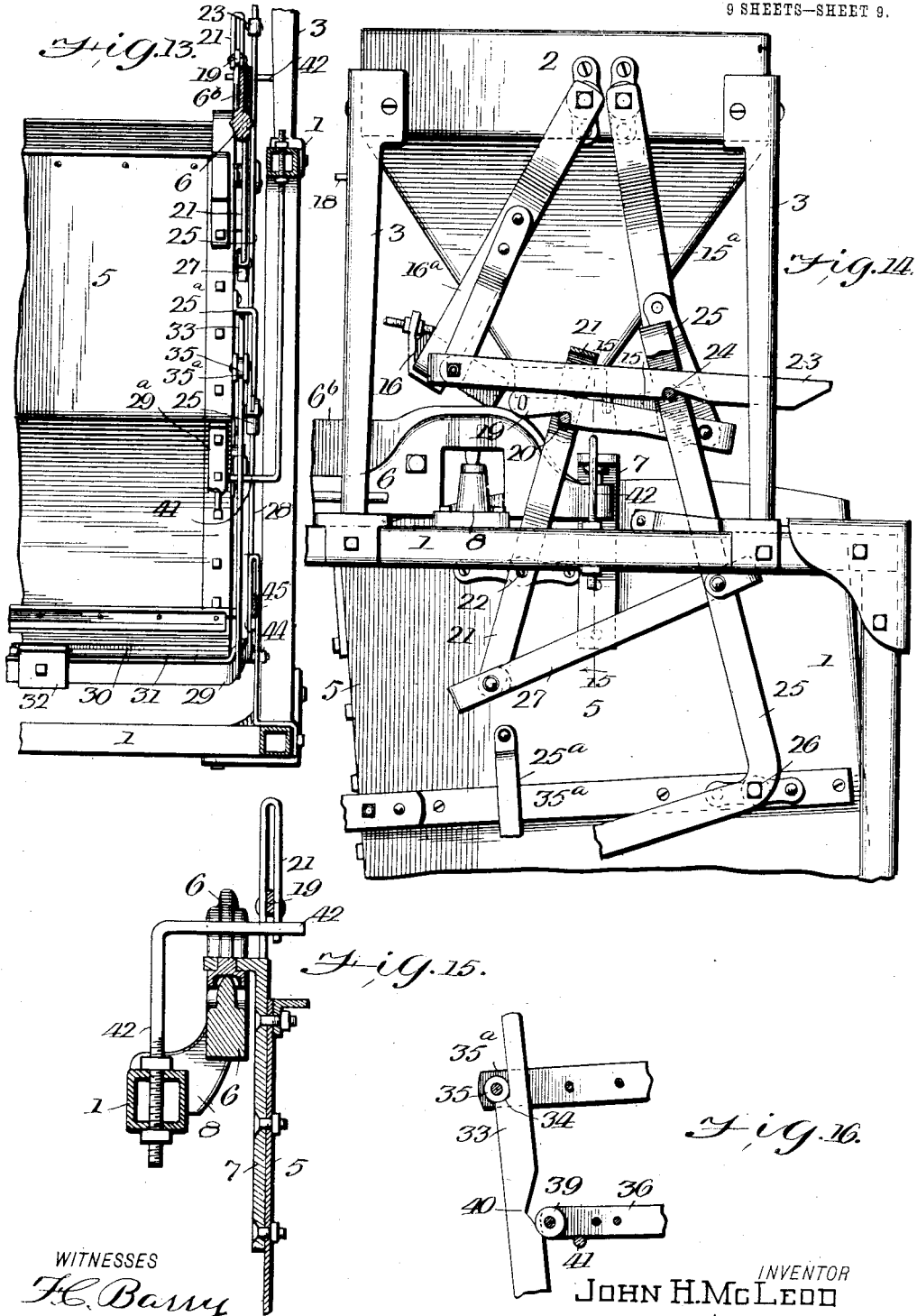

UNITED STATES PATENT OFFICE.

JOHN H. McLEOD, OF LA SALLE, ILLINOIS.

AUTOMATIC WEIGHING-MACHINE.

No. 867,745.  Specification of Letters Patent.  Patented Oct. 8, 1907.

Application filed February 27, 1907. Serial No. 359,630.

*To all whom it may concern:*

Be it known that I, JOHN H. McLEOD, a citizen of the United States, and a resident of La Salle, in the county of Lasalle and State of Illinois, have invented an Improved Automatic Weighing-Machine, of which the following is a specification.

My invention is an improvement in automatic machines for weighing grain or other substances, and is of that class in which the grain is received into a stationary hopper or bucket which is so connected with a graduated weighing beam as to tilt the latter when duly filled, whereupon the valve or gate closing the mouth of the weighing hopper is automatically opened to allow discharge of the contents.

My invention is more particularly an improvement upon the scales or automatic weigher covered by U. S. Letters Patent No. 706,442, granted August 5, 1902, and Patent No. 841,038, granted January 8, 1907.

By my improvement I have reduced the number of parts, or in other words, simplified the construction and reduced the weight and cost of the two previous machines, and at the same time secured increased efficiency.

Figure 1:
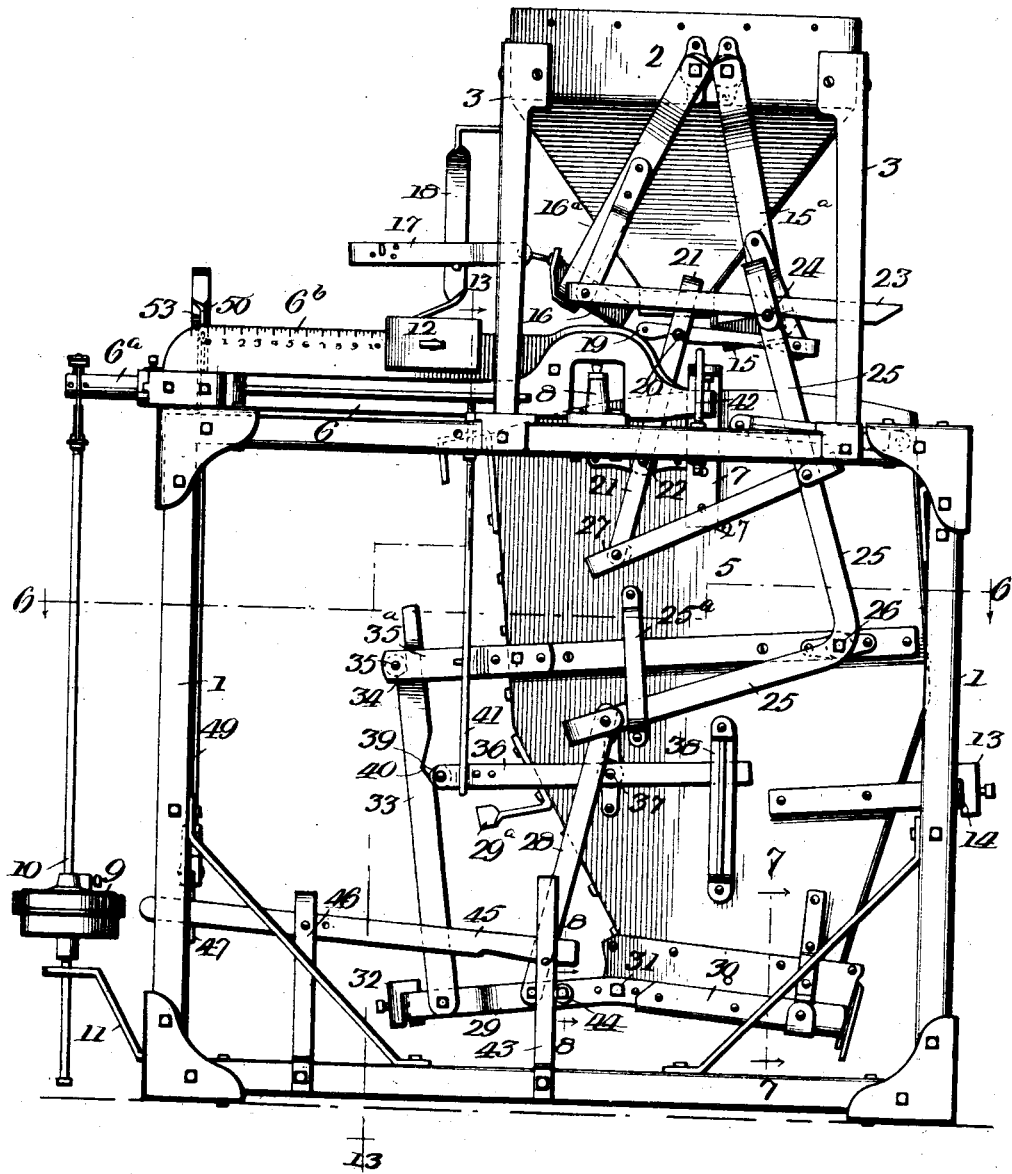
Figure 2:
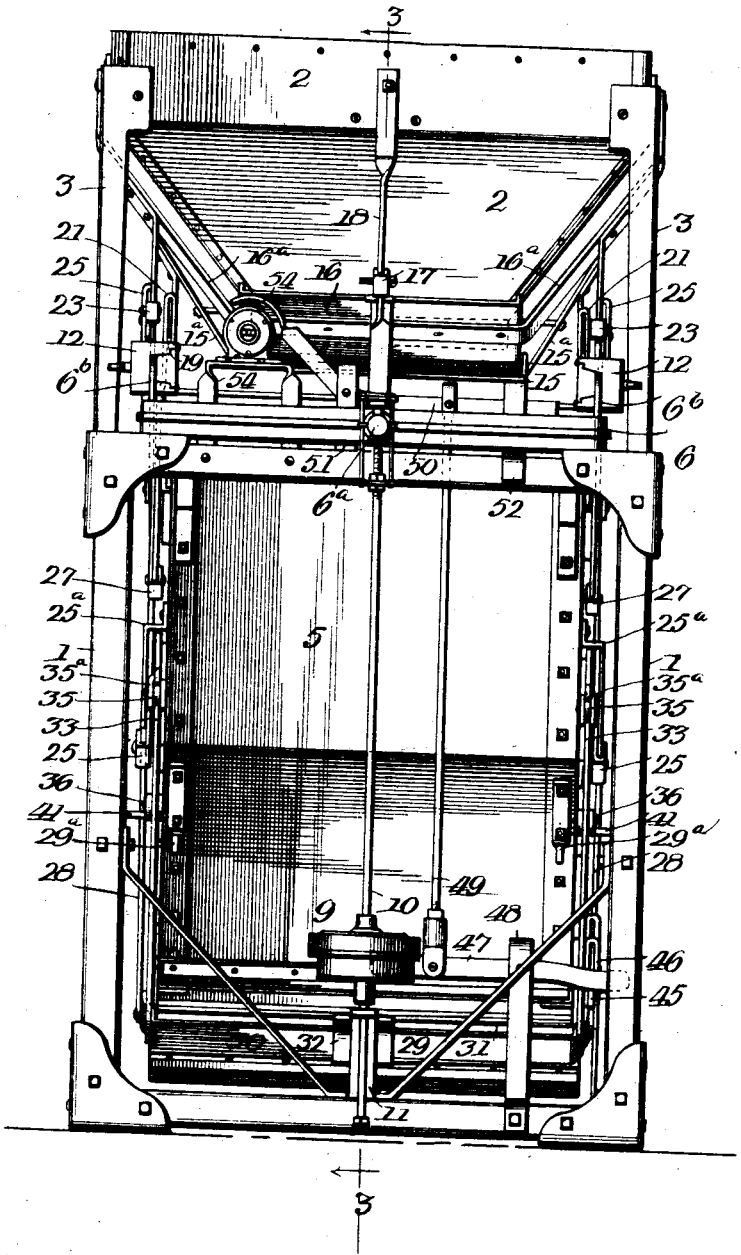
Figure 3:
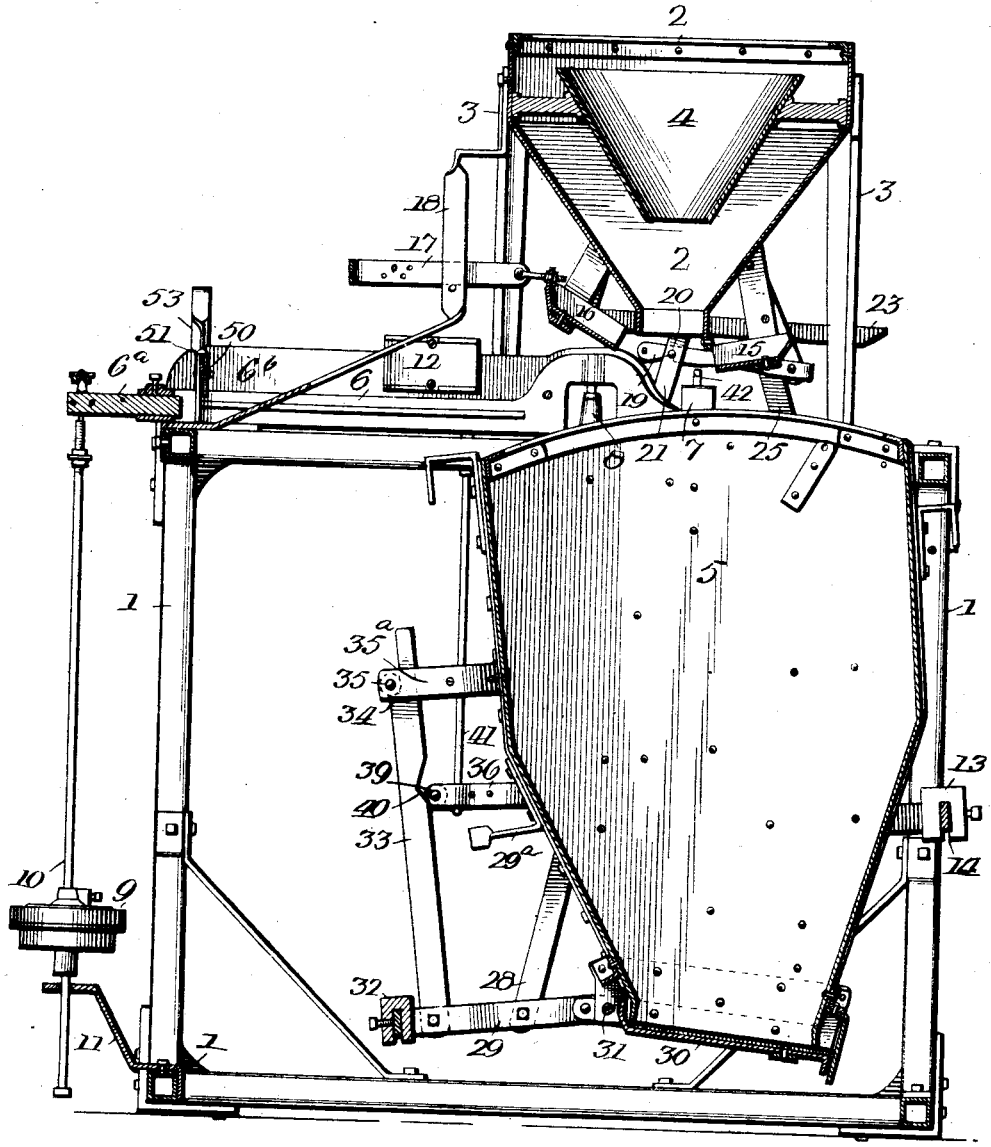
Figure 4:
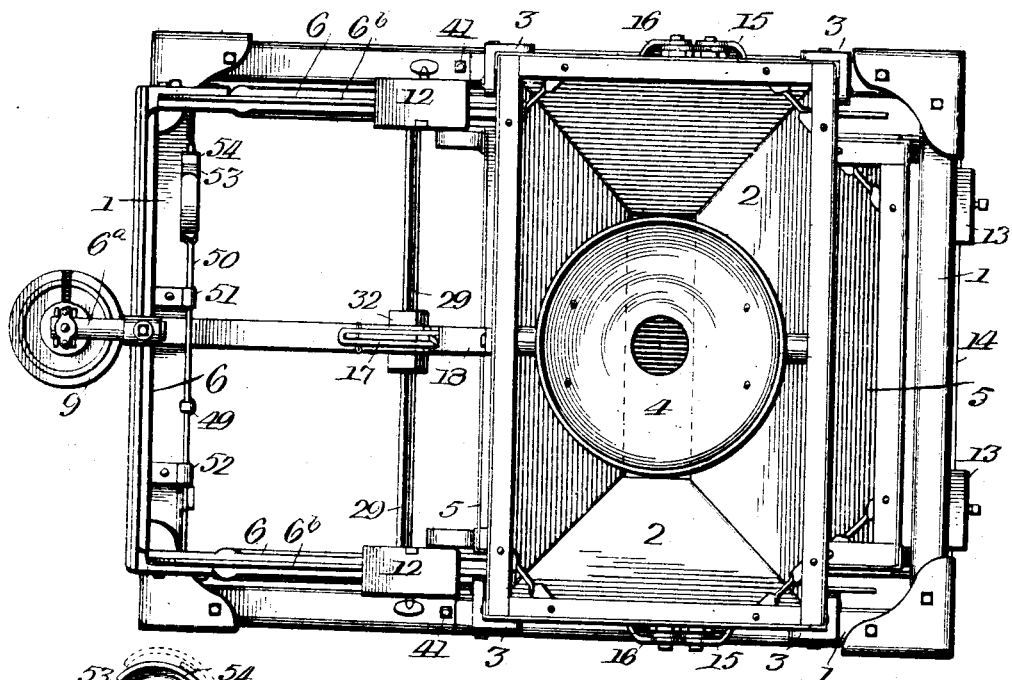
Figure 5:
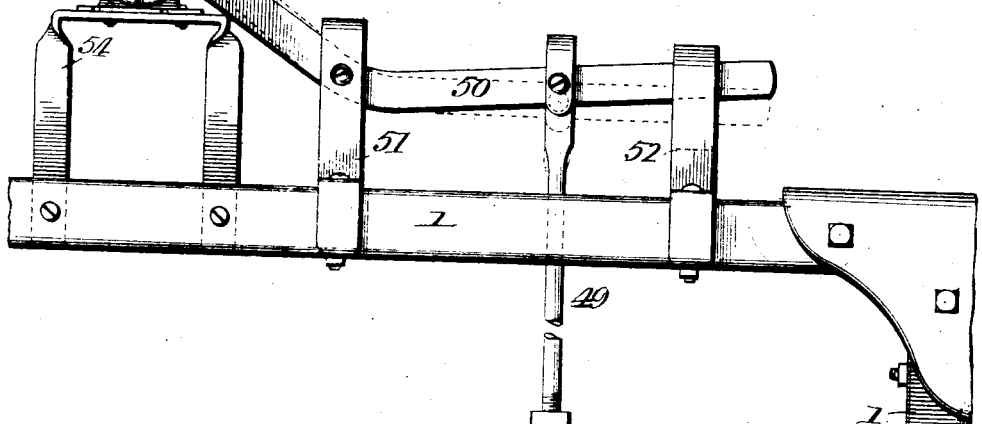
Figure 6:
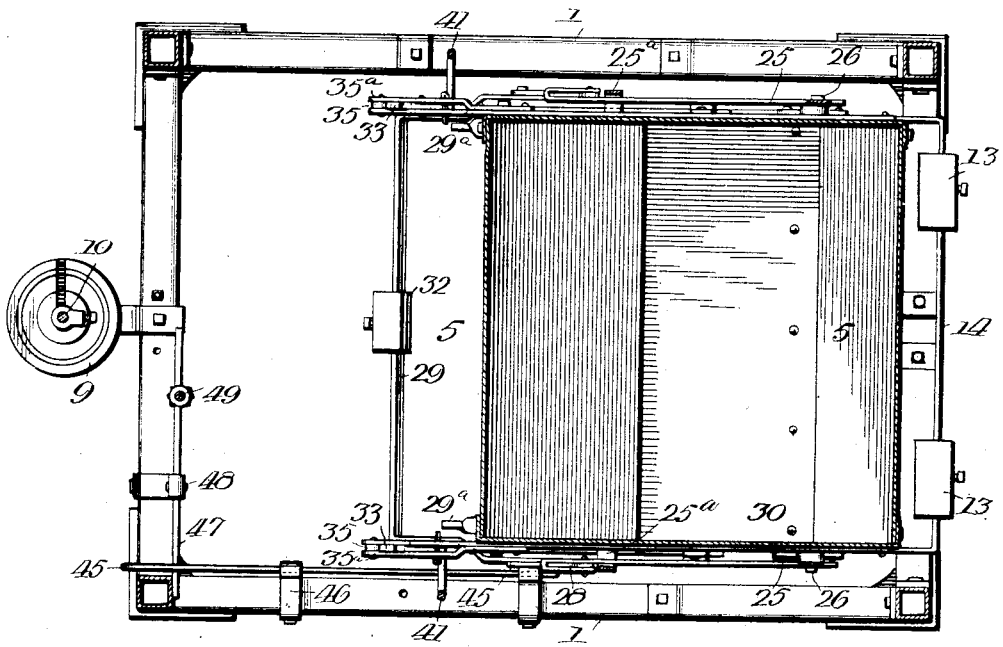
Figure 7:
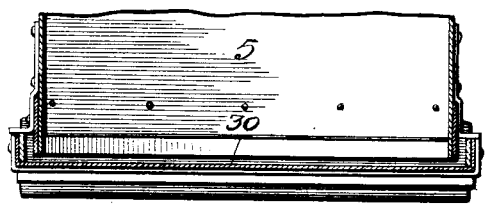
Figure 8:
Figure 9:
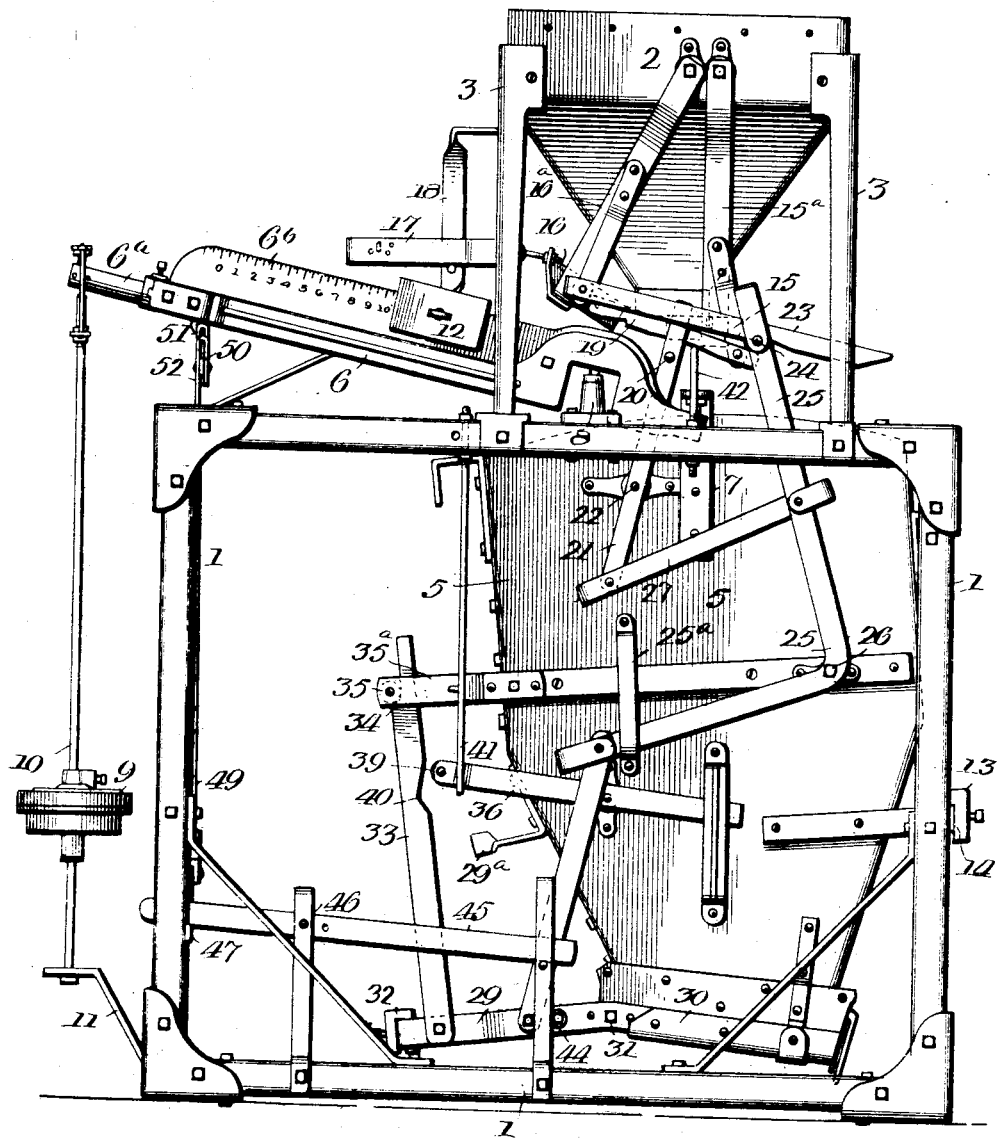
Figure 10:
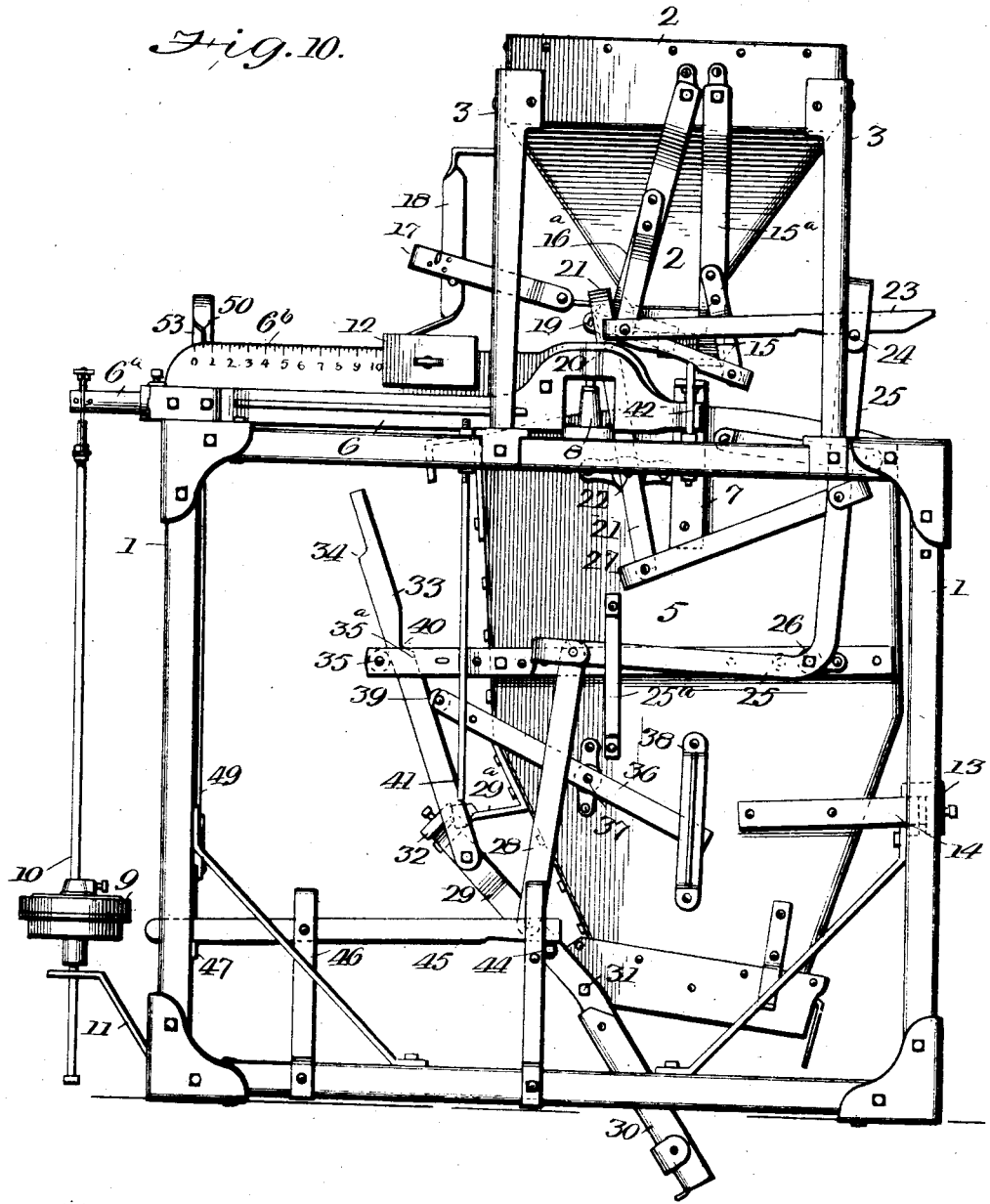
Figure 11:
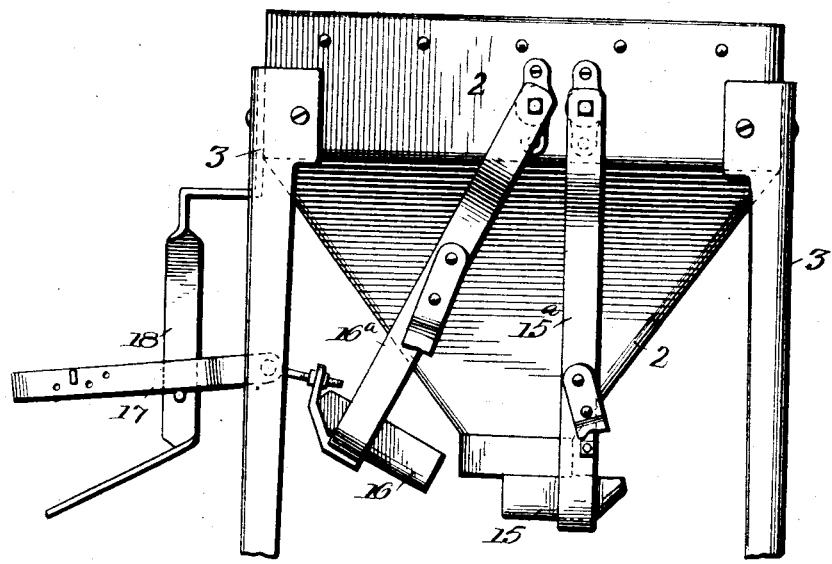
Figure 12:
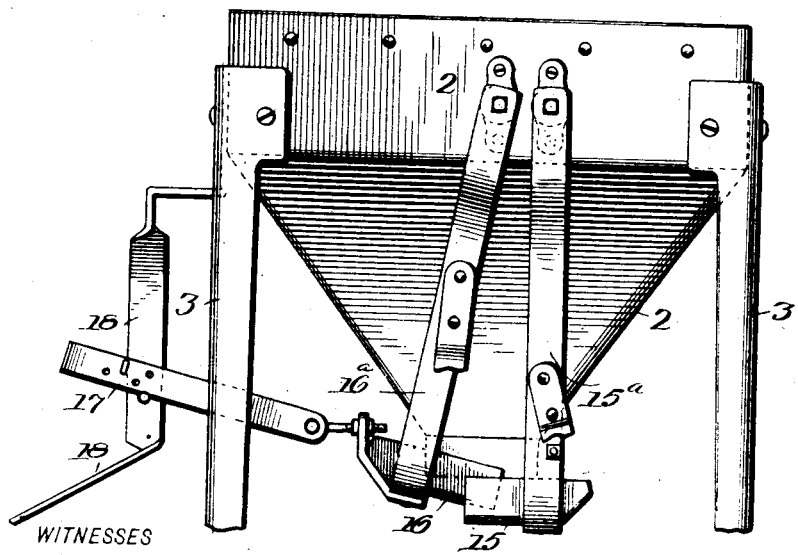

The details of construction, arrangement, combination and operation of parts are as hereinafter set forth and illustrated in the accompanying drawings, in which (Sheet 1) Figure 1 is a side view of the machine or apparatus adjusted for receiving and weighing grain or other articles. (Sheet 2) Fig. 2 is a front elevation of the machine. (Sheet 3) Fig. 3 is a central vertical section on the line 3—3 of Fig. 2. (Sheet 4) Fig. 4 is a plan view of the machine. Fig. 5 is a detail view illustrating the means or mechanism for operating the register. (Sheet 5) Fig. 6 is a horizontal section on the line 6—6 of Fig. 1. Fig. 7 is a vertical section on the line 7—7 of Fig. 1, the same being taken through the lower portion of the hopper and the gate therefor. Fig. 8 is a detail section on the line 8—8 of Fig. 1. (Sheet 6) Fig. 9 is a side elevation of the machine similar to Fig. 1, save that the weighing hopper, a cut-off valve, and the weighing beam are shown in the position they occupy when the hopper is descending by reason of accumulation of a predetermined weight of grain therein. (Sheet 7) Fig. 10 is a side view of the apparatus similar to Fig. 9, save that the hopper and weighing levers have been restored to their normal position, and the gate or valve of the weighing hopper has been opened to allow discharge of the contents. (Sheet 8) Fig. 11 is an end elevation of the fixed receiving hopper with one of the cut-offs or valves closed, corresponding in this respect to Figs. 9 and 10. Fig. 12 is an end view of the same hopper, showing both the valves or cut-offs closed. (Sheet 9) Fig. 13 is a vertical section on the line 13—13 of Fig. 1. Fig. 14 is an enlarged side elevation of the upper portion of the machine—parts being broken away—showing the cut-offs of the receiving hopper locked open. Fig. 15 is a vertical section on the line 15—15 of Fig. 14. Fig. 16 is a detail sectional view illustrating the lock by which the gate or discharge valve of the weighing hopper is held closed.

The machine presents precisely the same appearance on two opposite sides, one of which is shown in Figs. 1, 9, and 10. In other words, all the parts for operating the cut-offs and the gate connected with the respective hoppers, are duplicated on opposite sides of the machine.

The operative parts, fixed and movable, of the machine or apparatus are mounted upon or arranged within a rectangular frame 1 which is preferably constructed of hollow iron bars connected at their ends by stout angle pieces. A receiving hopper 2 is supported by standards 3 upon the main frame 1, and within it, as shown in Fig. 3, is arranged a small hopper 4 into which the grain or other material is discharged from a spout, whereby its fall by gravity is broken or arrested to a sufficient degree. From the larger receiving hopper 2, the grain passes into the weighing hopper 5. In this case, unlike the previous machine, the said hopper is pivoted and supported directly upon the weighing levers 6, the means of suspension being brackets 7 whose horizontal ends rest upon studs fixed in the inner ends of the weighing levers 6. The latter are supported and pivoted upon brackets 8, and their outer ends are connected by a cross bar from which projects an arm $6^a$ from which a weighing weight 9 is suspended by means of a rod 10 arranged in a guide bracket 11 attached to the front sill of the frame 1. Each of the weighing levers 6 is provided with a fin $6^b$ which is graduated, as indicated in Fig. 1, and upon which is arranged a slidable weight 12 for balancing the weighing hopper. A weight 13—see Figs. 1 and 3—is applied to the rear side of the hopper 5, it being supported by a horizontal bracket 14. This weight serves to balance the hopper so that it will swing properly on the pivots 7.

As in the machine forming the subject of the application before referred to, two grain cut-offs valves 15 and 16, are employed, the same serving when closed, as shown in Fig. 12, to entirely cut off the discharge of grain from the fixed hopper 2 into the weighing hopper 5. In practice, the valve 15 closes a little in advance of the other 16, instead of thus reducing the flow or stream of grain while valve 16 cuts off this attenuated stream. The valve 15 is supported from the fixed hopper 2 by hangers $15^a$, and the other valve 16 is similarly supported by hangers $16^a$. The inward movement of the valve 15 is also limited by a loop 17 which slides on a vertical bar 18 as in the patented machine referred to. The loop or bar 17 serves as before as a means for arresting the inward movement of the cut-off 16, as may be required for weighing wheat, rye, corn, oats, etc. A latch bar 19 is pivoted at one end to a downwardly projecting portion of the reducing valve 15, and its notched free end engages a pin 20 fixed in the upper looped portion of a lever 21 which is pivoted at 22 to the weighing hopper 5—see Figs. 1, 9, and 10. The cut-off 16 is provided with a longer latch bar 23, whose notched portion engages a pin 24 in the looped upper end of an elbow or angle lever 25, the same being pivoted at its angle 26 to the weighing hopper 5. The lower end of the pivoted lever 21, which the latch 19 of valve 15 engages, is connected by a bar 27 with the upper arm of the angle or elbow lever 25. The lower arm of the latter works in a keeper 25ª and is connected by a bar 28 with a lever arm 29 with which the gate or valve 30 of the weighing hopper is provided. Such gate is pivoted at 31 at one side of the mouth or discharge opening of the hopper 5—see especially Figs. 3 and 10. A weight 32 is applied to the lever arm 29 for balancing the gate. The latter is shown closed or in normal position in all the figures, save 10, where it is open as required for permitting discharge of a load from the weighing hopper. When the gate opens its arm 29 strikes upon stops 29ª attached to the weighing hopper.

As previously intimated, all the parts above referred to as connected with the reducing and cut-off valve and the gate, are duplicated on the opposite sides of the machine. The gate or valve 30 of the weighing hopper 5 is held normally closed by a lock bar 33 which is provided with a shoulder 34 that engages a roller 35 mounted rotatably on a pin in the outer looped or slotted end of a bar 35ª which is attached to the side of the hopper 5 in nearly horizontal position and extends forward therefrom. The angle lever 25 before referred to, is also pivoted to this bar, which is thus extended across the hopper merely for strengthening the latter. It is apparent that so long as the notch of the lock bar 33 engages the roller 35, the gate 30 cannot be opened. For holding the lock bar 33 in such position, while the hopper is being filled, I provide a pivoted dog or latch 36, the same consisting of a bar pivoted to the weighing hopper at 37 and arranged horizontally, its inner end being movable in a vertical guide 38 attached to the hopper. The outer end of the dog or latch is provided with an anti-friction roller 39 which engages or is in contact with the lock bar 33 at the lower end of a notch 40 formed in the latter. The outer end of the dog or latch 36 is supported by a hanger 41, consisting of a bar attached to the upper cross bar of the main frame and bent at a right angle at its lower end which projects under the latch bar as shown in Fig. 2. It is obvious that if the hopper should descend, so as to carry the notch 40 of the lock bar 33 down, and thus bring its apex or deepest part opposite the roller 39 of the latch 36, the shoulder of the lock bar 33 would no longer be held in firm engagement with the roller 35 of the fixed bar 36 and consequently the weight of grain pressing upon the gate would force the lock bar upward as shown in Fig. 10. In other words, the gate swings open on its pivot and the lever 29 connected with the gate presses the lock bar 33 upward. When an amount of grain or other substance has been received into the weighing hopper 5 which is sufficient to overcome the weight 9 suspended from the weighing lever 6, the latter will obviously rise or be tilted as shown in Fig. 9. At the same moment, the reducing valve 15 closes as there shown. This is effected by contact of latch bar 19 with a right angular stop 42—see Figs. 9 and 10. Said stop is secured to the upper side bar of the frame 1, and its horizontal or lateral arm projects beneath the latch bar 19. The latter as before described, is normally in engagement with the pin 20 of lever 21 pivoted to the hopper 5, and thus the cut-off is held open for discharge of grain from hopper 2 into the weighing hopper 5. As the latter descends, the lever 21 being carried with it, its pin 20 is removed from contact with the latch bar 19, which at the same time strikes upon the stop 42 so that it is raised or thrown upward as in Fig. 9, whereby the cut-off 15 swings to the closed position by gravity. Practically at the same moment, the dog 36 which as hitherto held the lock bar 33 engaged with the roller 35, as in Fig. 1, releases the lock bar, since the latter is carried down with the weighing hopper while the free or outer end of the dog 36 is prevented from falling by means of the hanger 41. Consequently as the hopper descends, the roller 39 in the outer end of the dog 36 is brought opposite the notch 40 of the lock bar 33, so that the latter has sufficient freedom of movement to allow it to escape from engagement with the roller 35 and slide upward as shown in Fig. 10. It is obvious that this unlocking movement will be effected by the weight of grain pressing on the gate 30. The other cut-off 16 must, however, be closed before the gate allows discharge of grain from the weighing hopper. The opening of the gate 30 effects release of the left hand cut-off 16 so that it swings to the closed position shown in Figs. 10 and 12, this being effected through the medium of the connecting bar 28 which tilts the angle lever 25 on its pivot 26, so that the upper member of said lever 25 swings backward and the latch bar 23 follows the same so that the cut-off 16 closes by gravity. The hopper 5 returns almost instantly to its original position, or so soon as a small quantity of grain has run out of the hopper, since the load on the weighing levers will no longer balance the weighing weight 9. The gate, however, remains open as in Fig. 10, until all the grain has run out, whereupon it is restored to its normal position, Fig. 1, by the balance weight 32 applied to its lever arm 29, and the dog 36 reëngages the lock bar 33 and holds it in a locked position as before. The closure of the gate 30 also opens the valve or cut-off 16 by reason of the fact that through the connecting bar 28, the angle lever 25 is swung on its pivot so that the pin 24 in its upper end reëngages the shoulder of the latch bar 23 and pushes the cut-off 16 back to the required position. Thus by the tilting or swinging movement of the angle lever 25, the cut-off 16 is opened positively and closes by gravity. The opening of the other or reducing valve 15 is also effected by reëngagement of its latch bar 19 with the pin 20 of lever 21, such engagement taking place when the hopper rises to its original position after descending as before described. When the gate is open as in Fig. 10, the lever 21 is in nearly vertical position by reason of the connection of its lower end with the angle lever 25 by means of the bar 27. Consequently the pin 20 in the lever 21 is engaged with or in position to engage with the shoulder of latch bar 19. As the gate 30 closes, the upper member of the angle lever 25 is swung to the left—see Fig. 1—and the upper arm or member of lever 21 is swung to the right so that the latch bar 19 is pushed backward far enough to open the cut-off 15.

Recapitulating briefly the operation, when a load sufficient to balance the weighing weight 9, has been received in the hopper 5, it descends a short distance and the cut-off 15 and the gate 30 are practically released simultaneously, and the cut-off 16 also closes. The hopper and the weighing levers 6 are almost instantly restored to position, while the gate 30 remains open; and after all the load is run out, the gate closes and is again locked, while the valves 15 and 16 are again opened, and the operation of filling and discharging the weighing hopper is repeated. For guiding and steadying the lower end of the hopper in its vertical movement, a bar 43 is attached to the side sill of the frame 1 and an anti-friction roller 44 mounted on a stud projecting from the side of the gate lever 29 works in contact with a right hand edge of such guide. The suspension of the hopper from the shorter arms of the weighing levers 6 and the provision of the guide 43 prevent any undesirable swinging movement of the hopper. The weights 13 applied to the bar 14 on the back of the hopper 5, are graduated so as to hold the rollers 44 in easy but constant engagement with the vertical guides 43. It will be seen that by hanging the weighing hopper directly upon the weighted weighing levers 6, I dispense with a supplemental supporting frame surrounding the hopper and in which the latter is pivoted, and I also dispense with lever mechanism intervening the hopper and the weighing levers as in the two prior machines to which reference has been made, and I thus greatly simplify the machine and reduce its cost and weight, while increasing its efficiency. It will also be seen that the gate or valve of the hopper 5 is operated for opening and closing by mechanism connected with the hopper itself and not by means independent of it; further, that the gate is connected with one of the cut-offs so that the operation of the latter depends directly upon the opening and closing of the gate.

When the hopper gate opens as shown in Fig. 10, the roller 44 projecting laterally from its lever arm 29, comes in contact with the inner end of a lever 45 which is pivoted to a vertical bracket or arm 46 attached to the frame and thus tilts said lever 45 so that it bears down upon a lever 47 which is similarly pivoted to a vertical arm or bracket 48 attached to the front sill of the frame. This lever 47 is connected—see Figs. 2 and 5—by a rod 49 with a lever 50 which is pivoted in a vertical arm or bracket 51 attached to the upper front cross bar of the frame 1. The right hand end of the lever 50 works in a vertical slotted guide 52, and the left hand end is curved upward over a register 53 which is supported upon brackets 54. When the hopper gate opens, the levers 45, 47 and 50 are all tilted as will be understood from dotted lines Fig. 5, and consequently the spring dog 54 of the register is pushed inward, thus operating the register automatically. When the hopper gate 30 is restored to its normal position, the lever mechanism which operates the register is also restored to normal position by gravity.

I claim:

1. In a weighing machine, the combination with a frame, a receiving hopper, a weighing hopper and weighing weighted levers pivoted upon the upper portion of the frame, the weighing hopper being suspended directly from the shorter arms of said levers, a pivoted gate for closing the mouth of the hopper, a lever arm connected with the gate, a vertical guide bar attached to the lower portion of the frame, and a lateral projection of the gate arm which works in contact with such guide as the hopper descends and rises in the weighing operation, substantially as described.

2. In a weighing machine, the combination with a frame, and weighing levers pivoted thereon, of a weighing hopper pivoted on the shorter arms of said levers, a balance weight applied to the outer side of the hopper, a stop and guide arranged on the opposite side of said hopper and attached to a fixed portion of the frame, a part connected with the hopper being arranged for contact therewith as the hopper rises and falls, substantially as described.

3. In a weighing machine, the combination with a frame, and a receiving hopper, of a movable cut-off for the latter, the weighted weighing levers pivoted on the frame, a swinging hopper pivoted on said levers and having a pivoted gate which normally closes the mouth of the same, a notched latch bar pivoted to the aforesaid cut-off, a lever pivoted to the hopper and its upper end provided with a pin for engaging the said latch bar, and means connecting the said lever with the gate whereby the closing of the latter opens the cut-off, substantially as described.

4. In a weighing machine, the combination with a frame, and a receiving hopper, of a movable reducing valve for said hopper, weighted weighing levers pivoted on the frame, a weighing hopper supported directly on said levers, a pivoted gate which normally closes the mouth of the weighing hopper, a lever mechanism attached to the hopper, a latch bar pivoted to the aforesaid valve and engaging said mechanism a stop fixed on the frame and adapted for engagement with the said latch bar, whereby it is raised out of engagement with the lever when the hopper descends, thus allowing the valve to close, substantially as described.

5. In a weighing machine, the combination with a frame and receiving hopper, of a swinging cut-off provided with a latch bar, a weighing hopper and weighing levers upon which it is hung, a gate pivoted to the lower end of the hopper and normally closing its mouth, and mechanism for operatively connecting such gate with the latch bar of the cut-off, whereby as the gate opens and closes the cut-off closes and opens correspondingly, substantially as described.

6. In a weighing machine, the combination with a frame, and a receiving hopper, of a swinging cut-off having a notched latch bar, a weighing hopper and weighted weighing levers pivoted on the frame and supporting said weighing hopper, a gate for closing the mouth of the weighing hopper, a lever pivoted to the hopper and its upper end engaging the latch of the cut-off, and means for connecting such lever with the gate whereby as the latter opens the cut-off is allowed to close and when the gate closes the lever is operated to open the cut-off, substantially as described.

7. In a weighing machine, the combination with a frame and a receiving hopper, of two swinging cut-offs for the latter, a weighing hopper supported below the receiving hopper and pivoted weighing levers upon which such hopper is directly supported, latch bars connected with the respective cut-offs, levers pivoted to the hopper and their upper ends provided with pins for engaging shoulders of said latch bars, a bar connecting the two levers, a gate pivoted to the lower end of the weighing hopper and normally closing its mouth, and a bar connecting it with the lever mechanism for operating the cut-offs whereby when the gate closes after discharge of a load, the levers connected with the latches of the two cut-offs are shifted on their pivots so as to move the cut-offs backward to the open position, substantially as described.

8. In a weighing machine the combination with a frame, and weighted levers pivoted thereon, of a weighing hopper hung directly on said levers, a gate pivoted and adapted to normally close the mouth of the hopper, and provided with a laterally extended arm, a shouldered lock bar pivoted to said arm, an arm fixed to the hopper and engaging the shoulder of the lock bar, a dog pivoted to the hopper and engaging said lock bar for holding the gate closed, and a stop or hanger connected with the frame which serves to prevent downward movement of the free end of the dog, whereby when the hopper descends with its load the outer end of the dog is raised and releases the lock bar thus allowing the gate to open, substantially as described.

9. In a weighing machine the combination with a frame, weighted weighing levers pivoted thereon, and a weighing hopper supported directly on the levers, of a gate pivoted to the lower end of the hopper for normally closing its mouth, and having a laterally extended arm, a lock bar pivoted to said arm, and having a notch and shoulder, a bar projecting from the hopper and engaging the shoulder of the lock bar, a dog pivoted to the hopper and a hanger for supporting its outer end, whereby it is held normally engaged with the lock bar at the edge of the notch therein, whereby as the hopper descends with its load, the notch of the lock bar is brought opposite the dog and the lock bar thereby released, thus allowing the gate to open, substantially as described.

10. In a weighing machine, the combination with a frame, weighted weighing levers pivoted thereon, a hopper suspended from said levers, a gate pivoted to the lower end of the same and normally closing the hopper, a lock bar operatively connected with the hopper and detachably engaging a fixed portion of the hopper, a device for holding it thus engaged, and a device for releasing the lock bar when the hopper descends with its load so that the gate is allowed to open automatically by gravity, substantially as described.

11. In a weighing machine, the combination with a frame and weighing levers, of a weighing hopper suspended from said levers, a pivoted gate for closing its mouth, a lock bar operatively connected with the gate for holding it normally closed, a dog pivoted to the hopper and engaging the lock bar, and a device attached to the frame and arranged for tripping the dog and releasing the lock bar and gate, substantially as described.

12. In a weighing machine, the combination with the frame, pivoted weighing levers and a hopper suspended therefrom and provided with a pivoted gate having a lever arm provided with a lateral projection, a pivoted lever with which such projection engages when the gate opens, a register mounted on the frame, and means for operatively connecting it with the aforesaid lever whereby the register is operated when the gate opens, substantially as described.

JOHN H. McLEOD.

Witnesses:
WILLIAM J. PARKS,
GERTRUDE K. PARKS.